(No Model.) 3 Sheets—Sheet 1.

H. P. WHITE.
DYNAMO ELECTRIC MACHINE.

No. 550,666. Patented Dec. 3, 1895.

Witnesses:
Walter S. Wood,
Marian Longyear.

Inventor,
Henry P. White
By Fred L. Chappell
Att'y.

(No Model.) 3 Sheets—Sheet 2.

H. P. WHITE.
DYNAMO ELECTRIC MACHINE.

No. 550,666. Patented Dec. 3, 1895.

Witnesses:
Walter S. Wood
Marian Longyear

Inventor,
Henry P. White
By Fred L. Chappell
Att'y.

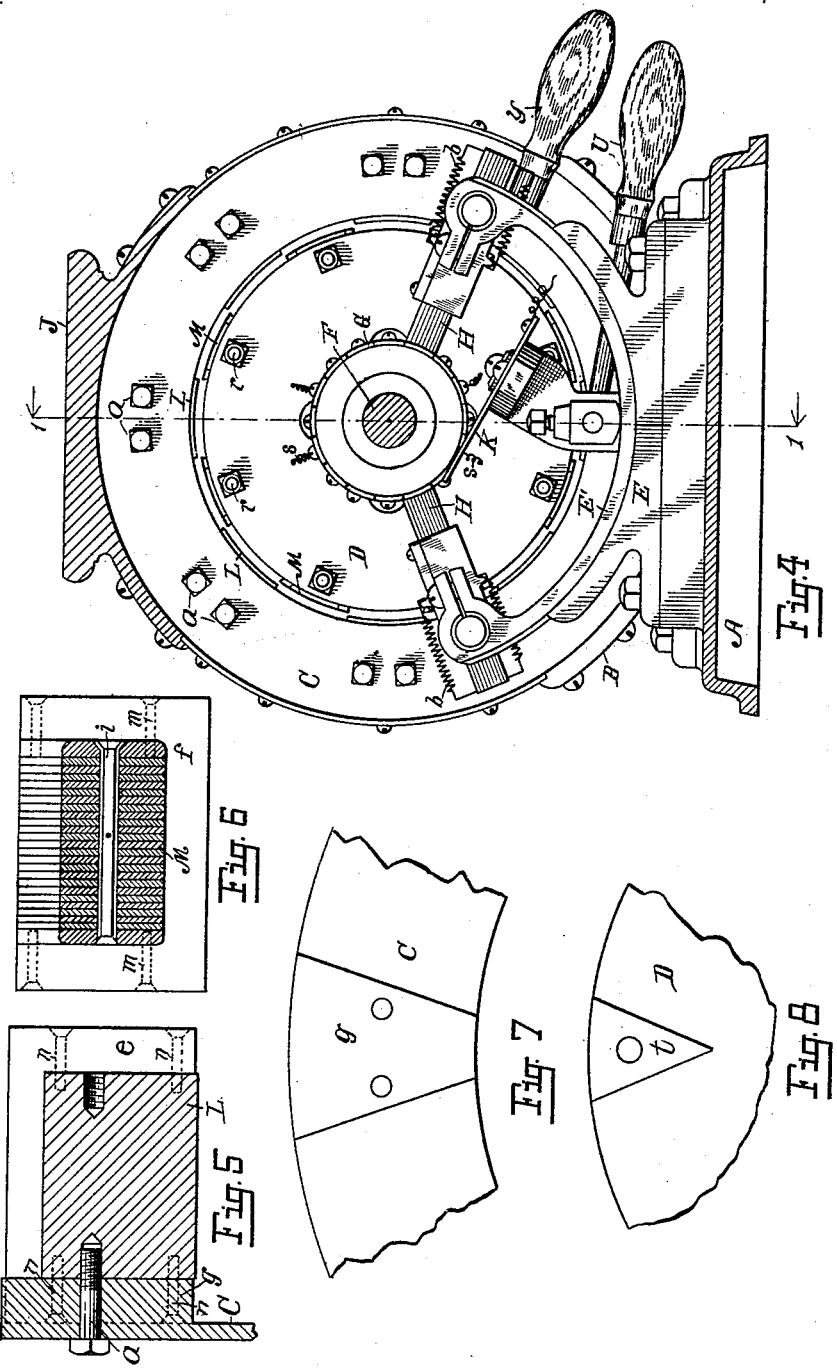

UNITED STATES PATENT OFFICE.

HENRY P. WHITE, OF KALAMAZOO, MICHIGAN, ASSIGNOR OF THREE-FOURTHS TO CHARLES D. FULLER, OF SAME PLACE.

DYNAMO-ELECTRIC MACHINE.

SPECIFICATION forming part of Letters Patent No. 550,666, dated December 3, 1895.

Application filed January 29, 1895. Serial No. 536,535. (No model.)

*To all whom it may concern:*

Be it known that I, HENRY P. WHITE, a citizen of the United States, residing at the city of Kalamazoo, in the county of Kalamazoo and State of Michigan, have invented certain new and useful Improvements in Dynamo-Electric Generators, of which the following is a specification.

My invention relates to improvements in dynamo-electric generators.

The objects of my invention are, first, to provide such an electric generator which shall produce for use either alternating currents or a direct continuous current; second, to provide a machine which shall produce an alternating current for use and at the same time be self-exciting; third, to provide a machine that will produce at the same time an alternating current and a direct current; fourth, to provide a machine which when operated at a given rate will produce alternating currents of distinct different potential from the same machine; fifth, to provide a dynamo-electric machine for utilizing a large number of armature and field magnets at a comparatively low speed; sixth, to provide in a dynamo improvements in the constructions of the fields and armatures; seventh, to provide in a dynamo-electric machine means for utilizing the full force of a large number of field-magnets and armatures on a single shaft in comparatively small heads and fields; eighth, to provide in a simple dynamo-electric machine means for producing a direct continuous current direct from the machine; ninth, to provide in a dynamo-electric machine means of controlling and reversing the current by a slight adjustment of the commutator-brushes, and other improvements that will appear in the detailed description. I accomplish these objects of my invention by the devices shown in the accompanying drawings, in which—

Figure 1:
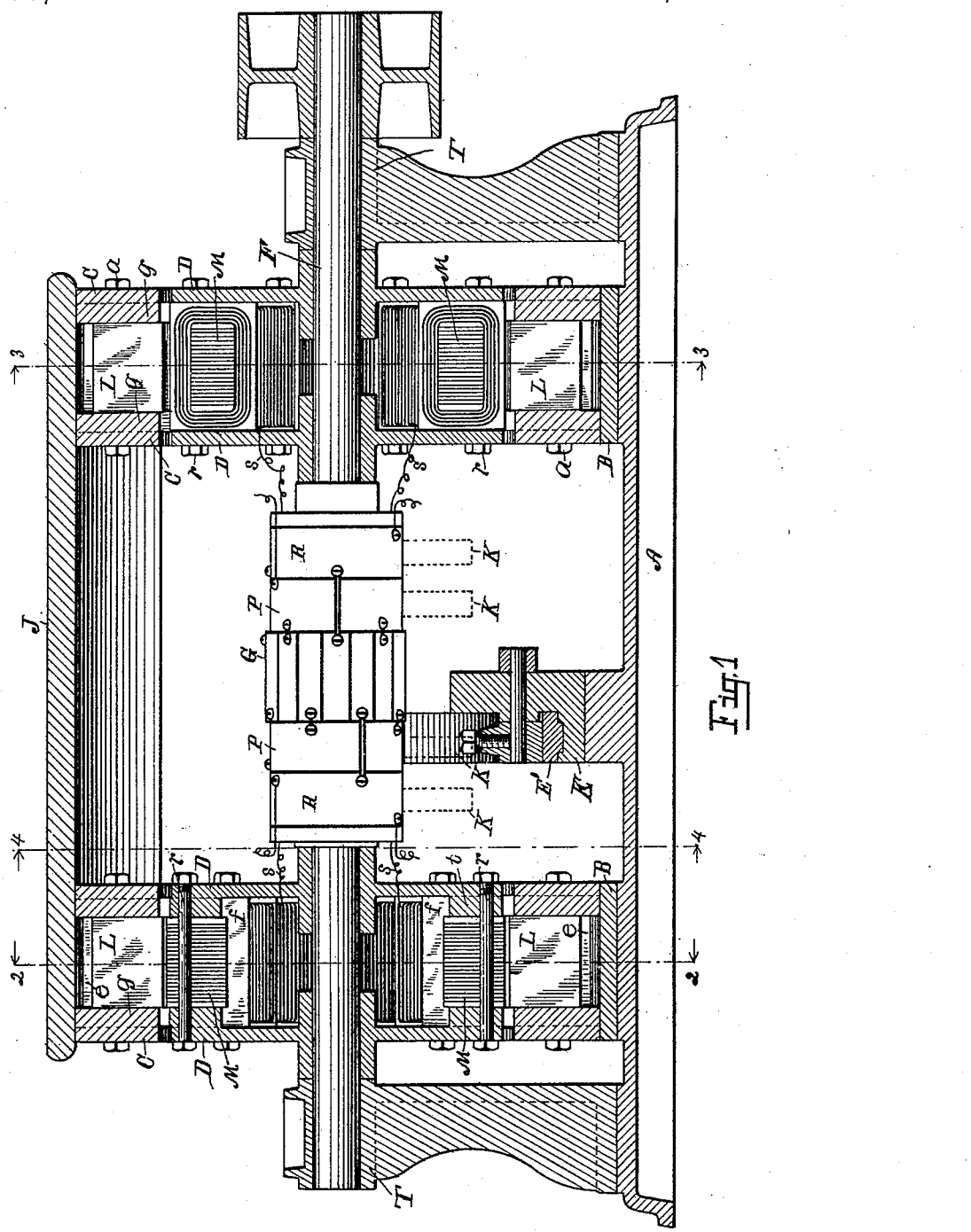
Figure 3:
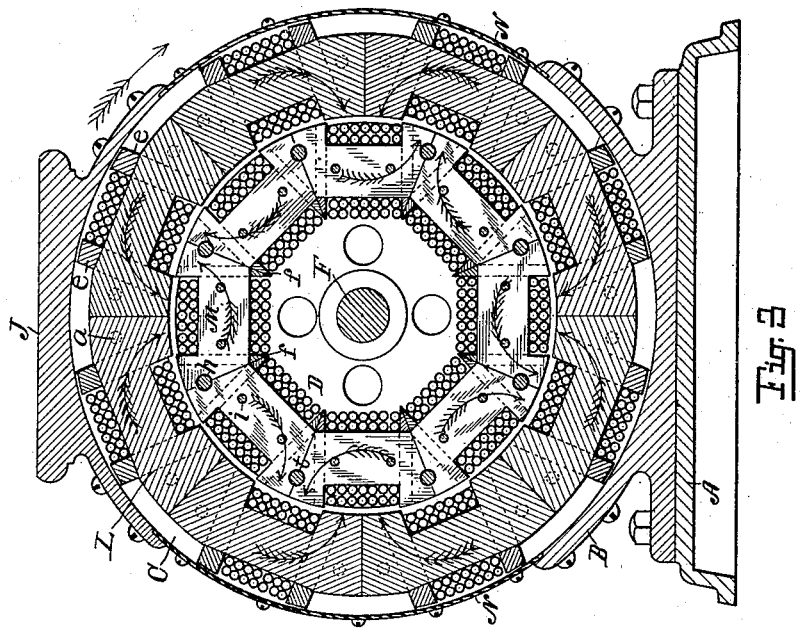
Figure 2:
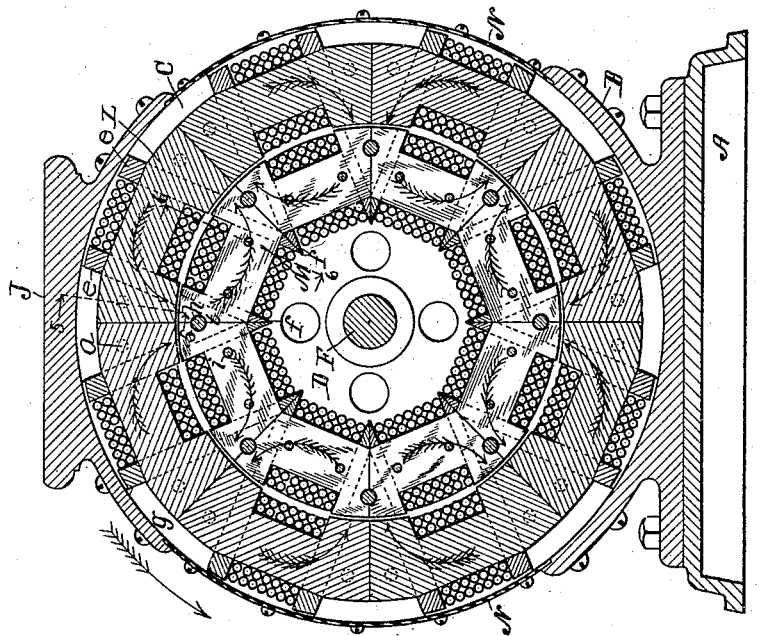

Figure 1 presents a vertical sectional view through the longitudinal axis of my improved machine on line 1 1 of Fig. 4, the commutator not being in section. Fig. 2 presents a sectional view on line 2 2 of Fig. 1. Fig. 3 presents a sectional view on line 3 3 of Fig. 1. Fig. 4 presents a sectional view on line 4 4 of Fig. 1. Fig. 5 is an enlarged detail sectional view through the field-magnets on line 5 5 of Fig. 2. Fig. 6 is an enlarged sectional view of a part of the armature-head, taken on line 6 6 of Fig. 2. Fig. 7 is an enlarged detail view of a part of the field. Fig. 8 is an enlarged detail view of a part of the armature-head.

All of the sectional views are taken looking in the direction of the little arrows at the ends of the section-lines.

Similar letters of reference refer to similar parts throughout the several views.

Referring to the lettered parts of the drawings, A represents the base, on which the remaining portions of my improved dynamo-electric machine are supported.

B represents the saddles or brackets which support the field-magnets.

J represents the top casing.

N N represent the side casings of the machine.

F represents the main shaft, which is supported in the bearing-boxes T T to each end. At the middle of the shaft is the commutator. Toward each end of the shaft are supported the armature-heads, which revolve inside the field-magnets, which are supported, as I said before, on the saddles B B toward each end.

The fields of this improved machine are made up of a series of horseshoe magnets L, on the central portions of which are coiled suitable magnet-wire, the wiring being retained in place by the diamagnetic pieces $e$ $e$, which are secured to the magnets L by small screws $n$ $n$. These magnets are held in place between the diamagnetic plates C C, being secured in position by the bolts or screws $a$ $a$ and the projecting shouldered portions $g$. (See Fig. 7.) The armature is also made up of horseshoe magnets M, the poles of which point outwardly and are a distance apart corresponding to the distance between the poles of the field-magnets. These magnets M are supported between diamagnetic plates D D, which are shaped with shouldered projections $t$, corresponding to the projections $g$ on the field-magnet plates, and are held very securely in place by the bolts $r$, extending through the same. Brass bars $f$ are secured to the magnets and extend across and around the same to locate in positive position the magnet-wires wound upon the same.

The armature-magnets are preferably laminated and insulated and secured together by the rivets $i$. The central portion of the armature-head is left hollow with apertures through at the side to permit a passage of air to assist in keeping the same cool. An air-space is also left around the exterior of the field-magnets to assist in keeping them cool. What I have said as to the fields and armatures applies to the field-magnets and armature-heads at both ends of the shaft. The armatures are mounted upon the shaft, their relative position being one-half of the length of the magnet apart. (See Figs. 2 and 3.) The current is therefore generated from first one and then the other alternately, thus making it possible to increase the frequency of the impulses without increasing the rapidity of the rotation of the heads.

The brushes H H (see Fig. 4) bear upon the segments G of the commutator. These segments G are connected to the rings R and P to each side, and wires are also connected to the brushes H on these segments and extend to the field-magnets, so that in operation the brushes on the segments G will deliver a direct current while rings R and P at each side are delivering the alternating currents, and all or a portion of the current delivered from the segments G serves to excite the field-magnets. By this it will be seen hat my machine is self-exciting, that it will deliver a direct and alternating current at the same time, and all or any part of the capacity of the machine can be utilized either from the rings R P as alternating current or from the segments G as direct current. Separate rings R and P can be added, from which the alternating currents can be taken that are insulated and not connected to the center segments.

In the wiring of my improved dynamo-electric machine the wiring on the field-magnets is such that the north-seeking poles will be indicated by the heads of the arrows marked thereon, and they are connected to the brushes on the commutator-segments G to receive the current to cause them to take that position. It will be noted that there must be an even number of the field-magnets in the field in order to have the arrangement come right—that is, there must be either two, four, six, eight, or some multiple of two, as will be readily understood from inspection. The magnets in the armature-heads in passing the magnets of the field receive their alternate magnetic conditions, as indicated by the positions of the arrows, when they are in position indicated in the figures.

It will be noted that on examining Figs. 2 and 3, which are sectional views on line 2 2 and line 3 3 of Fig. 1, respectively, the armatures are a distance of one-half the length of a magnet apart, while the field-magnets occupy the same position. It will be observed that when they are in this position the wiring from the armature-coils connects to the rings of the commutators R and P each side, respectively. When the current receives the full force from one side, the opposite side of the machine is neutral, and vice versa, so that in operation when the shaft F is revolved an alternating current can be taken from each pair of rings R P, and, as I said before, by properly connecting the brushes K K K K of these rings the frequency of the alternation of the current can be doubled for the same speed, or two distinct alternating currents can be taken off, one from each half of the machine. The brushes on the center segments will take off a direct current at the same time generated from both halves of the machine, and this current generated from both halves of the machine will excite the field-magnets. It is believed this seeming repetition will make clear the wiring and connections of the machine. It is immaterial whether the magnets of the field are connected in a series or each one is connected separately to the segmental portion of the armature G, and the magnets of the armature-heads can be connected similarly, in either way giving corresponding effects upon the current produced.

To secure the best results in a continuous current from the central brushes, the combined width of a segment and a brush should equal the same part of the circle as one of the field-magnets. The periphery of the commutator should be divided into sections corresponding to the number of field-magnets in the fields, and each section should contain as many segments at least as there are pairs of connected rings.

In the machine shown in the drawings it will be noted that in each field there are eight field-magnets and that there are two armature-heads, and following out my rule, as stated above, there will be in the central segments of the armature eight sections, a section to each magnet in the field; and following the rule still further it will be noted that there are two pairs of rings, a pair for each armature-head, and therefore there should be two segments in each commutator-section; and following out the rule still further the brush should be of such width that when added to the width of one of the commutator-segments the combined width of the two will equal the same part of the circle as one of the field-magnets. I would have in this instance a brush which will be equal, approximately, to the width of one of the segments, so that the brush plus one of the segments would equal two-sixteenths of the circle, which is one-eighth, which equals the part of the circle which one of the field-magnets occupies. The brushes should occupy a position on the segments of the commutator relative to the sections of the field which they represent to secure the greatest result from the machine. The current can be varied or even reversed by varying that position. The brushes can be adjusted by adjusting the segmental piece E'. (See Fig. 4.)

Having thus described my improved dynamo-electric machine, I desire to state that it can be considerably varied in its details without departing from my invention. The machine, instead of being made up of two fields and two armature-heads only, can be made up of four, or six, or eight, or, in fact, any greater number than two by arranging the same the appropriate distance apart in their revolutions, so that the magnets in each head will operate successively to induce each one its effect separately, and the resulting currents of the whole can be delivered on one central commutator constructed on the plan indicated. This, it will be readily understood, enables the production of a machine of great power, which can be operated at a comparatively low speed, and also secures in the same machine means of producing alternating currents or a direct current, and also a machine producing an alternating current, which machine is self-exciting. The capacity of this machine can be utilized from any portion of the commutator desired, either from the rings or from the segments, or both, in any proportion required.

I desire to state, further, that the relative position of the armature-heads and commutator and commutator-rings and commutator-segments is not material to the successful working of my improved dynamo-electric machine. The armature-heads can all be placed to one side with the commutator at the end by properly insulating and locating the connecting-wires, and the commutator-rings can be placed all on the same side of the commutator-segments in any construction, if such a construction should be found desirable, or, in fact, the segments, rings, and armature-heads can be placed together in any way desired, without departing from my invention, as will be readily understood by those skilled in the art to which this invention pertains.

Having thus described my invention, what I claim as new, and desire to secure by Letters Patent, is—

1. In a dynamo electric machine, the combination of the shaft, F; a plurality of armature heads on said shaft with the magnets thereof alternating with each other each acting in its appropriate magnetic field successively and alternately; a commutator on said shaft with pairs of rings corresponding to each armature-head and connected therewith; insulated segments in said commutator to which the said rings are connected alternately and successively; and suitable brushes on said rings and on said segments; and a connection from the brushes on said segments to the field magnets to excite the same, all substantially as described for the purpose specified.

2. In a dynamo electric machine, the combination of the shaft, F; a plurality of armature heads on said shaft with the magnets thereof placed alternately and successively with each other acting in appropriate magnetic fields successively and alternately, the relation of the magnets of the armature heads to their respective field magnets being the one in advance of the other a part of one of the intervals so that they shall act alternately and successively; a commutator on said shaft with pairs of insulated rings, R, P, corresponding to each armature head and connected by suitable wirings to the magnet coils of their respective armature heads; insulated segment portions, G, on said commutator connected to the several pairs of rings, R, P, alternately and successively; brushes, K, K, K, K, resting on said commutator rings, R, P; brushes, H, adapted to rest on said commutator segments, G; wires connecting said brushes, H, to the field magnets to induce therein the magnetism indicated by the arrows thereon; and wires connecting the brushes, K, K, and H, H, to deliver currents from said machine either as an alternating current or direct current or both in proportions required, as specified.

3. In a dynamo electric machine, the combination of a suitable shaft; a plurality of armature heads on said shaft with the magnets thereof alternating to act successively and alternately in appropriate fields; a suitable commutator connected to said armatures to receive impulses from the armature heads successively and alternately to utilize a large number of magnets in a revolution of the shaft with a comparatively small diameter of armature heads to increase the power of the machine without increasing its rate of motion, for the purpose specified.

4. In a dynamo electric machine, the combination of a plurality of armature heads with the magnets thereof alternating with each other thus being arranged to act successively and alternately in appropriate fields; a suitable commutator containing segments which are connected to said armature heads to receive impulses therefrom successively and alternately to increase the number of heads acting in the machine to increase the power of the machine; and suitable commutator brushes of substantially the same width as the segments of the commutator which may pass over and engage two successive commutator segments at once to receive the combined impulses, as specified.

5. In a dynamo electric machine, the combination of the shaft, F; a plurality of armature heads on said shaft the magnets whereof are arranged successively and alternately and each acting in appropriate magnetic fields successively and alternately with each other; a commutator on said shaft with pairs of rings corresponding to each armature head and connected therewith to be excited by electricity of opposite polarity; insulated segments in said commutator to which said rings are connected alternately and successively; and suitable brushes of a width sufficient to engage two succeeding segments at the same time during the revolution to keep the current continuous; brushes on said commutator rings; and a connection from said brushes on said segments to the field magnets to excite the same; and connections to all of the brushes for delivering either alternating currents or direct currents or both for use, as specified.

6. In a dynamo electric machine, the combination of the shaft, F; a plurality of armature heads on said shaft each acting in appropriate field magnets successively and alternately; a commutator in said shaft with rings corresponding to each armature head and connected therewith; insulated segments of equal width with the insulation between of equal width in said commutator to which said rings are connected alternately and successively; suitable brushes to rest on said commutator segments of the greatest width sufficient to engage only a number of segments proportioned to the whole number of segments as a field magnet is to the whole number of field magnets to each particular field, at the same time during the revolution to secure a continuous current and a connection from said brushes on said segments to the field magnets to excite the same; brushes on said rings; and connections to all of the brushes for delivering either an alternating or direct current or both for use, as specified.

7. In a dynamo electric machine, the combination of the shaft, F; a plurality of armature heads on said shaft each acting in appropriate field magnets successively and alternately; a commutator in said shaft with rings corresponding to each armature head and connected therewith; insulated segments in said commutator to which said rings are connected alternately and successively; suitable adjustable brushes to rest on said commutator of the greatest width sufficient to engage a number of segments proportioned to the whole number of segments as a field magnet is to the whole number of field magnets to each particular field, at the same time during the revolution to secure a continuous current and a connection from said brushes on said segments to the field magnets to excite the same; and connections to all of the brushes for delivering either an alternating or direct current or both for use, as specified.

8. In a dynamo electric machine, the combination of the shaft, F; a plurality of armature heads on said shaft acting in corresponding magnetic fields successively and alternately, the relation of the magnets and armature heads to their respective field magnets being the one in advance of the other a part of the intervals so that they shall act alternately and successively; a commutator on said shaft with pairs of insulated rings, R, P, corresponding to each armature head and connected by suitable wirings to the magnet coils of their respective armature heads; insulated segment portions, G, on said commutator connected to the several pairs of rings, R, P, in alternate and successive series; brushes, K, K, K, K, resting on said armature rings, R, P; brushes, H, of substantially the same width as said commutator segments and greater than the width of the insulation resting on said segments, G; wires connecting said brushes, H, to the field magnets to induce the magnetism indicated by the arrows thereon; and wires connecting the brushes, K, K, and H, H, to deliver the currents from said machine either as an alternating current or a continuous current, or both, in the proportions required, as specified.

9. In a dynamo electric machine, the combination of a suitable shaft; a plurality of armature heads on said shaft acting successively and alternately in appropriate magnetic fields; a suitable commutator containing segments and connected to said armatures to receive impulses from the armature heads successively and alternately to utilize a large number of magnets in a revolution of the shaft with a comparatively small diameter of the armature heads; and brushes resting on said commutator segments adapted to come in contact with two successive segments at the same time in passing to receive impulses in such a manner as to induce a continuous current, substantially as specified.

10. In a dynamo electric machine, the combination of a plurality of armature heads arranged to act successively and alternately in appropriate fields; a suitable commutator containing conductor portions connected to said armature heads to receive impulses therefrom successively and alternately to increase the power of the machine without increasing the rate of motion; and suitable brushes each of sufficient width to engage at least two of the succeeding segments of said commutator at the same time to secure a continuous current, for the purpose specified.

11. In a dynamo electric machine, the combination of the shaft; a plurality of armature heads on said shaft arranged to act successively and alternately in appropriate fields; a suitable commutator containing segments connected to said armature heads to receive impulses therefrom successively and alternately there being the same number of sections in the commutator as there are magnets in the field and the same number of segments in each section as there are armature heads; a brush which occupies on the commutator a portion of the circle equal to that occupied by a field magnet less the width of one of the segments, adjusted on the commutator to act in unison with the fields to produce the results specified.

12. In a dynamo electric machine, the combination of the shaft; a plurality of armature heads on said shaft arranged to act successively and alternately in appropriate fields; a suitable commutator containing segments connected to said armature heads to receive impulses therefrom successively and alternately there being the same number of sections in the commutator as there are magnets in the field and the same number of segments in each section as there are armature heads; a brush which occupies on the commutator a portion of the circle equal to that occupied by the field magnets less the width of one of the segments on the commutator to act in unison with the fields to produce the results specified.

13. In a dynamo electric machine, the combination of the shaft; a plurality of armature heads on said shaft arranged to act successively and alternately in appropriate fields; a suitable commutator containing pairs of rings and segments which are connected to said armature heads alternately and successively; brushes resting on the segments of said commutator; and connections from said segments of the commutator to the rings thereof sufficient to induce a continuous current; and connections from said brushes to the coils of the field magnets; and brushes resting upon the commutator rings to deliver alternating currents therefrom, for the purpose specified.

In witness whereof I have hereunto set my hand and seal in the presence of two witnesses.

HENRY P. WHITE. [L. S.]

Witnesses:
WALTER S. WOOD,
MARIAN I. LONGYEAR.